US012655877B2

(12) United States Patent
Yang et al.

(10) Patent No.: US 12,655,877 B2
(45) Date of Patent: Jun. 16, 2026

(54) STRUCTURE OF CLUTCH RING AND SUPPORT RING

(71) Applicant: Hyundai Transys Inc., Seosan-si (KR)

(72) Inventors: Se Dong Yang, Hwaseong-si (KR);
Jong Bae Ahn, Hwaseong-si (KR);
Sangheon Lee, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 18/918,851

(22) Filed: Oct. 17, 2024

(65) Prior Publication Data

US 2025/0137494 A1     May 1, 2025

(30) Foreign Application Priority Data

Oct. 31, 2023    (KR) ........................ 10-2023-0148245

(51) Int. Cl.
F16D 11/14        (2006.01)
F16D 11/00        (2006.01)

(52) U.S. Cl.
CPC ........ F16D 11/14 (2013.01); F16D 2011/002 (2013.01); F16D 2011/008 (2013.01)

(58) Field of Classification Search
CPC .............. F16D 11/00; F16D 2011/002; F16D 2011/008; F16D 11/10; F16D 11/14; F16D 2011/0004; F16D 2023/0668; F16H 48/24; B60K 17/34–17/346
See application file for complete search history.

(56) References Cited

U.S. PATENT DOCUMENTS

| | | | | | |
|---|---|---|---|---|---|
| 5,699,871 | A | * | 12/1997 | Hara ........................ | F16D 11/14 192/69.83 |
| 2006/0163021 | A1 | * | 7/2006 | Tsukada .................... | F16D 3/12 192/55.61 |
| 2013/0240318 | A1 | * | 9/2013 | Mori ........................ | F16D 11/10 192/69.9 |
| 2014/0144744 | A1 | * | 5/2014 | Hirawaki ................ | F16D 48/06 192/69.9 |
| 2015/0343901 | A1 | * | 12/2015 | Brooks .................... | F16D 11/14 180/245 |
| 2016/0303966 | A1 | * | 10/2016 | Horie ...................... | F16D 11/14 |

FOREIGN PATENT DOCUMENTS

| | | |
|---|---|---|
| JP | 2000-249164 A | 9/2000 |
| JP | 2009-293675 A | 12/2009 |
| JP | 2013-217490 A | 10/2013 |
| JP | 2013-217491 A | 10/2013 |
| JP | 2014105826 A * | 6/2014 |
| JP | 2015-224738 A | 12/2015 |
| JP | 2016-205447 A | 12/2016 |
| JP | 2023-034715 A | 3/2023 |
| KR | 10-2018-0122053 A | 11/2018 |
| KR | 10-2022-0165554 A | 12/2022 |

* cited by examiner

*Primary Examiner* — Richard M Lorence
(74) *Attorney, Agent, or Firm* — Bridgeway IP Law Group, PLLC; Juhun Kim

(57) ABSTRACT

A structure of a clutch ring and a support ring includes at least one inclined contact surface provided at a tip of a tooth of the clutch ring, at least one counterpart inclined contact surface provided at a tip of a tooth of the support ring, wherein the inclined contact surface is configured to slide in a state in which the inclined contact surface is in contact with the counterpart inclined contact surface when the clutch ring and the support ring mesh with each other, such that the clutch ring and the support ring mesh with each other.

6 Claims, 7 Drawing Sheets

STRUCTURE OF CLUTCH RING AND SUPPORT RING

CROSS-REFERENCE TO RELATED APPLICATIONS

This application claims priority to and the benefit of Korean Patent Application No. 10-2023-0148245 filed in the Korean Intellectual Property Office on Oct. 31, 2023, the entire contents of which are incorporated herein by reference.

TECHNICAL FIELD

The present invention relates to a structure of a clutch ring and a support ring mounted in a disconnector apparatus.

BACKGROUND ART

In general, a disconnector apparatus refers to an apparatus mounted in a differential assembly and capable of minimizing an unnecessary loss of power by switching between two-wheel drive (2WD) and four-wheel drive (4WD) by engaging or disengaging a differential shaft depending on a traveling situation.

A disconnector apparatus may include a differential casing, a support ring mounted in a differential casing, a pinion gear mounted in a support ring, left and right side gears configured to mesh with the pinion gear, and a clutch ring configured to mesh with the support ring.

A sleeve connected to an actuator device may be moved in a meshing direction by an operation of the actuator device. When the sleeve moves in the meshing direction, the clutch ring connected to the sleeve moves toward the support ring, such that a meshing (interlocking) state may be implemented in which teeth of the clutch ring engage with teeth of the support ring. Therefore, four-wheel drive (4WD) may be implemented.

On the contrary, the sleeve may be moved in a meshing release direction by the operation of the actuator device. When the sleeve moves in the meshing release direction, the clutch ring connected to the sleeve is separated from the support ring, such that the meshing state between the clutch ring and the support ring may be released. Therefore, two-wheel drive (2WD) may be implemented.

However, in the related art, because tips of the teeth of the clutch ring and the support ring of the disconnector apparatus each have a flat surface structure, there is a problem in that an impact occurs as the teeth of the clutch ring and the teeth of the support ring collide with each other when the clutch ring and the support ring mesh with each other, and a large amount of meshing time is required.

DOCUMENT OF RELATED ART

Patent Document (Patent Document 1) Korean Patent Application Laid-Open No. 10-2022-0165554 (published on Dec. 15, 2022)

SUMMARY OF THE INVENTION

The present invention has been made in an effort to solve the above-mentioned problem, and an object of the present invention is to provide a structure of a clutch ring and a support ring, in which at least one inclined contact surface and at least one counterpart inclined contact surface are formed at tips of teeth of the clutch ring and the support ring, such that the clutch ring and the support ring may smoothly mesh with each other.

In order to achieve the above-mentioned object, the present invention provides a structure of a clutch ring and a support ring, in which at least one inclined contact surface is provided at a tip of a tooth of the clutch ring, at least one counterpart inclined contact surface is provided at a tip of a tooth of the support ring, and the inclined contact surface slides in a state in which the inclined contact surface in contact with the counterpart inclined contact surface when the clutch ring and the support ring mesh with each other, such that the clutch ring and the support ring mesh with each other.

In addition, the inclined contact surface may be provided at one side of the tip of the tooth of the clutch ring, and the inclined contact surface may define an acute angle with respect to a tip end of the tooth of the clutch ring.

In addition, the counterpart inclined contact surface may be provided at one side of the tip of the tooth of the support ring opposite to the inclined contact surface, and the counterpart inclined contact surface may define an acute angle with respect to a tip end of the tooth of the support ring.

In addition, the inclined contact surface may be provided at one side of the tip of the tooth of the clutch ring, a tip end of the tooth of the clutch ring, which excludes the inclined contact surface, may be configured as a flat surface, and the inclined contact surface may define an obtuse angle with respect to the tip end of the tooth of the clutch ring.

In addition, the counterpart inclined contact surface may be provided at one side of the tip of the tooth of the support ring opposite to the inclined contact surface, a tip end of the tooth of the support ring, which excludes the counterpart inclined contact surface, may be configured as a flat surface, and the counterpart inclined contact surface may define an obtuse angle with respect to the tip end of the tooth of the support ring.

In addition, the inclined contact surfaces may be provided at two opposite sides of the tip of the tooth of the clutch ring.

In addition, the counterpart inclined contact surfaces may be provided at two opposite sides of the tip of the tooth of the support ring opposite to the inclined contact surfaces provided at the two opposite sides.

In addition, a tip end of the tooth of the clutch ring, which is positioned between the inclined contact surfaces provided at the two opposite sides, may be configured as a flat surface, and the inclined contact surface may define an obtuse angle of the tip end of the tooth of the clutch ring.

In addition, a tip end of the tooth of the support ring, which is provided between the counterpart inclined contact surfaces provided at the two opposite sides, may be configured as a flat surface, and the counterpart inclined contact surface may define an obtuse angle with respect to the tip end of the tooth of the support ring.

In addition, the teeth of the clutch ring may be formed along an inner-diameter portion directed toward the support ring, and the teeth of the support ring may be formed along an outer-diameter portion directed toward the clutch ring.

In addition, the clutch ring and the support ring may be mounted in a casing of a disconnector apparatus, and the clutch ring may mesh with the support ring while being moved toward the support ring by a sleeve moved by an operation of an actuator device.

According to the present invention, at least one inclined contact surface and at least one counterpart inclined contact surface are formed at the tips of the teeth of the clutch ring and the support ring, such that the clutch ring and the support ring may smoothly mesh with each other.

In addition, according to the present invention, it is possible to solve the problem in the related art in that because the tips of the teeth of the clutch ring and the support ring each have a flat surface structure, an impact occurs as the teeth of the clutch ring and the teeth of the support ring collide with each other when the clutch ring and the support ring mesh with each other, and a large amount of time is required for the clutch ring and the support ring to mesh with each other.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
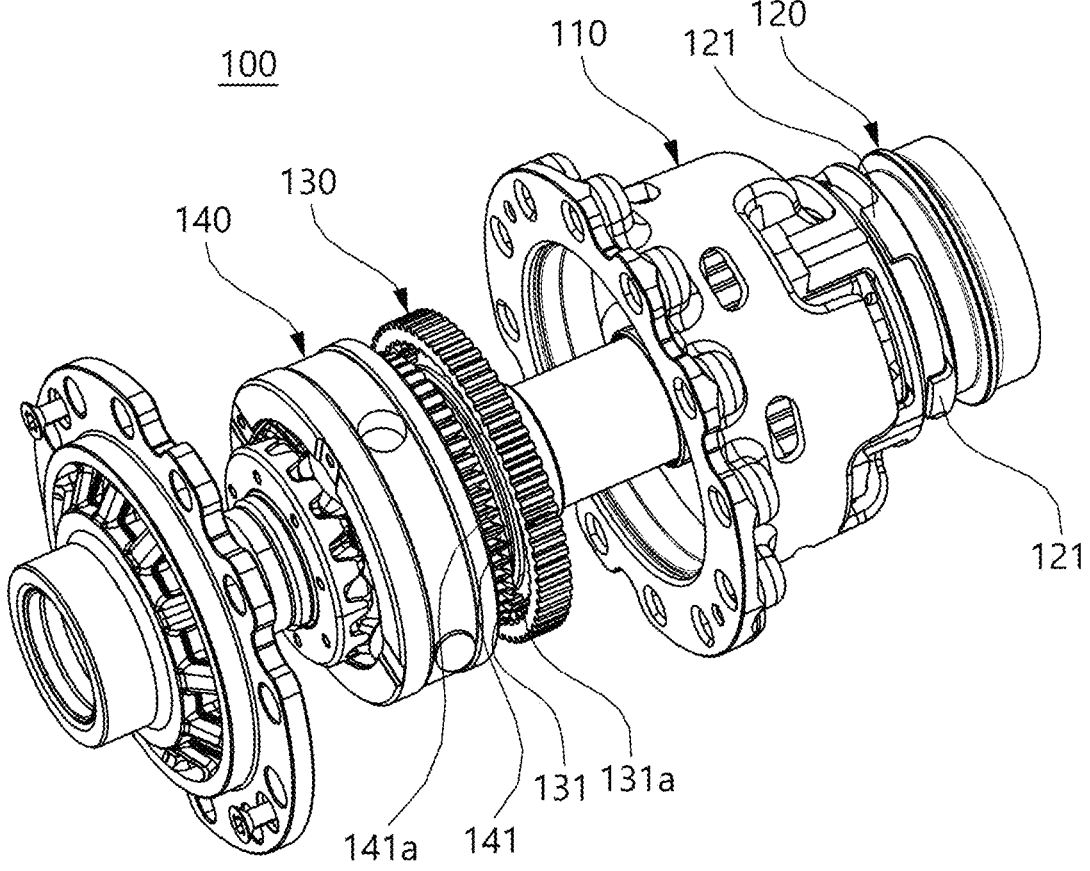
FIG. 1 is a view illustrating a clutch ring and a support ring mounted in a disconnector apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

FIG. 1 is a view illustrating a clutch ring and a support ring mounted in a disconnector apparatus according to an exemplary embodiment of the present invention.

As illustrated in FIG. 1, a disconnector apparatus 100 may include a casing 110, the support ring 140 mounted in the casing 110, a pinion gear (not illustrated) mounted in the support ring 140, left and right side gears (not illustrated) configured to mesh with the pinion gear (not illustrated), and the clutch ring 130 configured to mesh with the support ring 140.

When an actuator device (not illustrated) operates, a sleeve 120 connected to the actuator device (not illustrated) may move toward the support ring 140.

The clutch ring 130 connected to the sleeve 120 may be moved toward the support ring 140 by the movement of the sleeve 120. A connection portion 121, which is connected to the clutch ring 130, may be provided on a surface of the sleeve 120 directed toward the clutch ring 130. The connection portion 121 may be provided as a plurality of connection portions 121.

The clutch ring 130 may move toward the support ring 140 and mesh with the support ring 140.

The sleeve 120 connected to the actuator device (not illustrated) may be moved in the meshing direction by the operation of the actuator device (not illustrated). When the sleeve 120 moves in the meshing direction, the clutch ring 130 connected to the sleeve 120 moves toward the support ring 140, such that a meshing (interlocking) state may be implemented in which the teeth 131a of the clutch ring 130 engage with the teeth 141a of the support ring 140. Therefore, four-wheel drive (4WD) may be implemented.

On the contrary, the sleeve 120 may be moved in a meshing release direction by the operation of the actuator device (not illustrated). When the sleeve 120 moves in the meshing release direction, the clutch ring 130 connected to the sleeve 120 is separated from the support ring 140, such that the meshing state between the clutch ring 130 and the support ring 140 may be released. Therefore, two-wheel drive (2WD) may be implemented.

Figure 2:
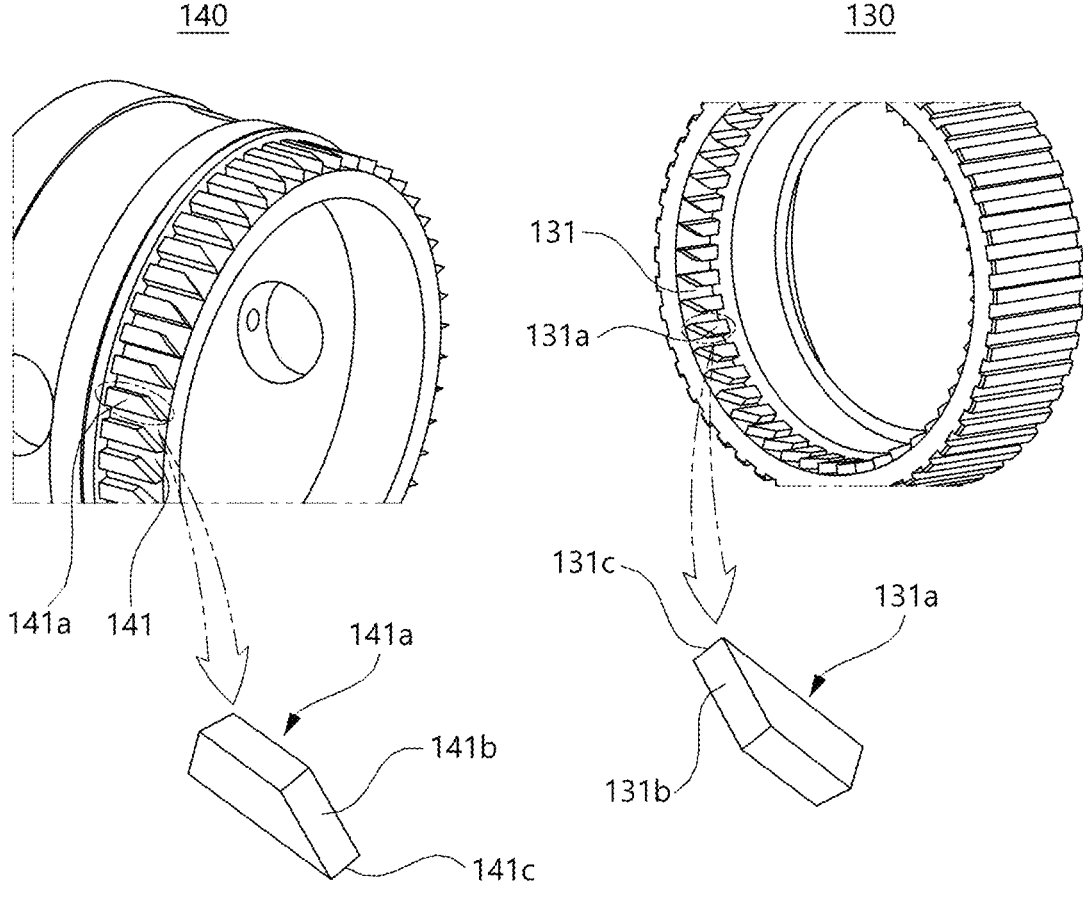
FIG. 2 is an enlarged view of a clutch ring and a support ring according to a first embodiment of the present invention.
Figure 3:
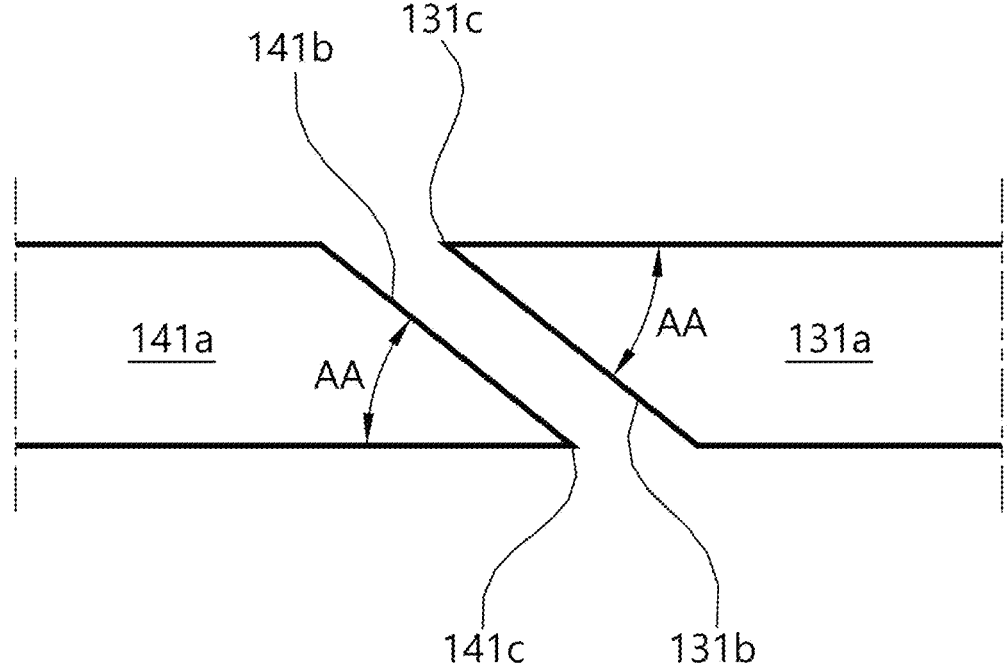
FIG. 3 is a view schematically illustrating a tooth of the clutch ring and a tooth of the support ring in FIG. 2.

FIG. 2 is an enlarged view of a clutch ring and a support ring according to a first embodiment of the present invention, and FIG. 3 is a view schematically illustrating a tooth of the clutch ring and a tooth of the support ring in FIG. 2.

As illustrated in FIGS. 2 and 3, in the first embodiment of the present invention, the teeth 131a of the clutch ring 130 may be formed along an inner-diameter portion 131 directed toward the support ring 140. The teeth 141a of the support ring 140 may be formed along an outer-diameter portion 141 directed toward the clutch ring 130. When the clutch ring 130 and the support ring 140 mesh with each other, the outer-diameter portion 141 of the support ring 140 may be inserted into the inner-diameter portion 131 of the clutch ring 130.

An inclined contact surface 131b may be provided at one side of the tip of the tooth 131a of the clutch ring 130.

The inclined contact surface 131b of the clutch ring 130 may be configured as an inclined surface that defines an acute angle AA with respect to a tip end 131c of the tooth 131a of the clutch ring 130.

A counterpart inclined contact surface 141b may be provided at one side of the tip of the tooth 141a of the support ring 140 opposite to the inclined contact surface 131b of the clutch ring 130.

The counterpart inclined contact surface 141*b* of the support ring 140 may be configured as an inclined surface that defines the acute angle AA with respect to a tip end 141*c* of the tooth 141*a*.

When the clutch ring 130 and the support ring 140 mesh with each other, the clutch ring 130 moves toward the support ring 140, and the inclined contact surface 131*b* of the tooth 131*a* of the clutch ring 130 may come into contact with the counterpart inclined contact surface 141*b* of the support ring 140.

The teeth 131*a* of the clutch ring 130 may be easily inserted between the teeth 141*a* of the support ring 140 as the inclined contact surface 131*b* slides along the counterpart inclined contact surface 141*b* in a state in which the inclined contact surface 131*b* is in contact with the counterpart inclined contact surface 141*b* of the support ring 140. Therefore, the clutch ring 130 and the support ring 140 may smoothly mesh with each other.

Figure 4:
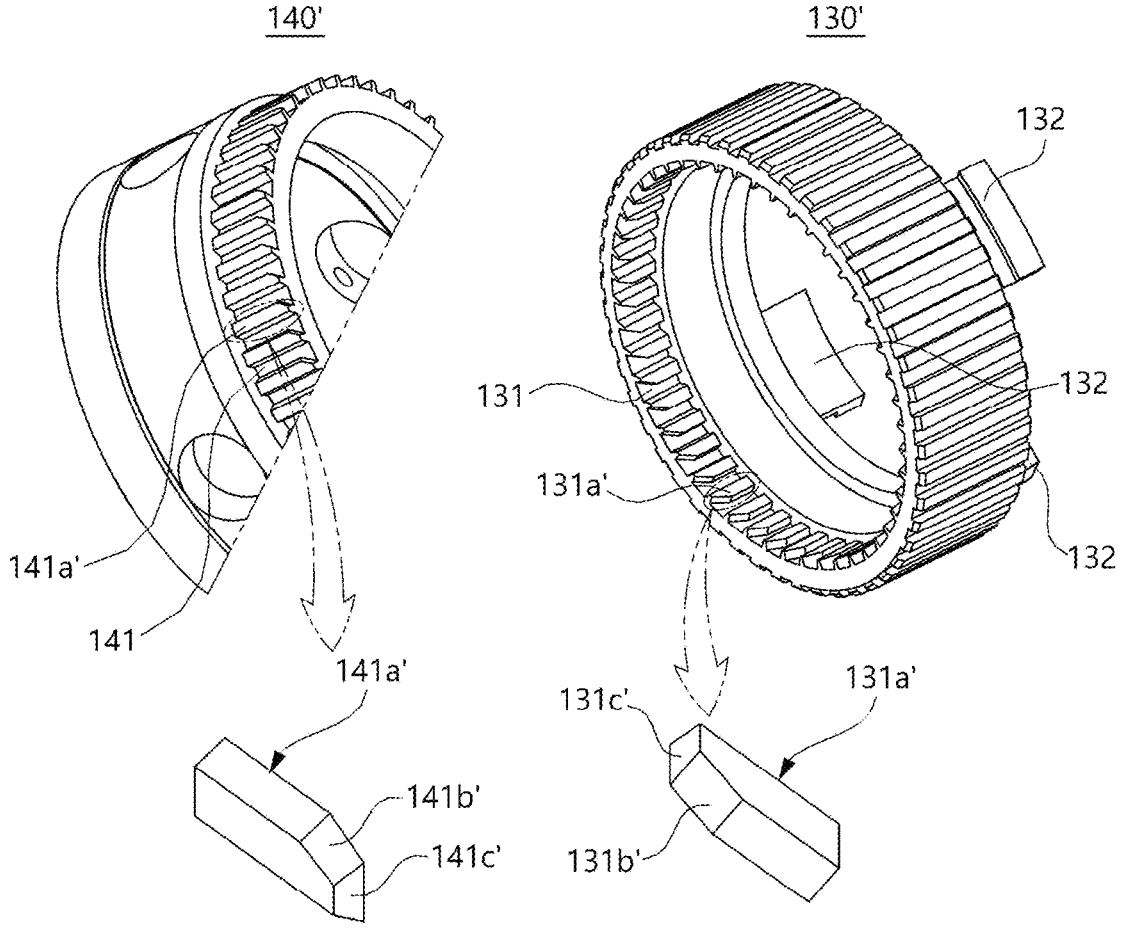
FIG. 4 is an enlarged view of a clutch ring and a support ring according to a second embodiment of the present invention.
Figure 5:
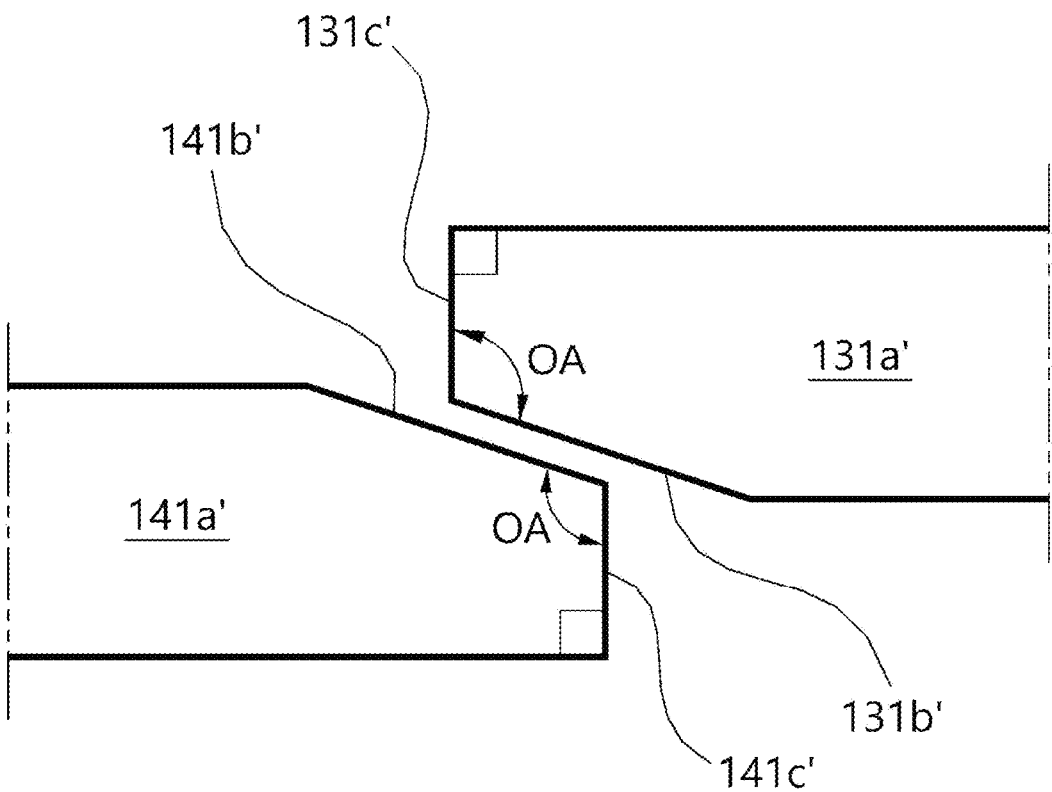
FIG. 5 is a view schematically illustrating a tooth of the clutch ring and a tooth of the support ring in FIG. 4.

FIG. 4 is an enlarged view of a clutch ring and a support ring according to a second embodiment of the present invention, and FIG. 5 is a view schematically illustrating a tooth of the clutch ring and a tooth of the support ring in FIG. 4.

As illustrated in FIGS. 4 and 5, in the second embodiment of the present invention, the teeth 131*a*' of the clutch ring 130' may be formed along the inner-diameter portion 131 directed toward the support ring 140'. The teeth 141*a*' of the support ring 140' may be formed along the outer-diameter portion 141 directed toward the clutch ring 130'. When the clutch ring 130' and the support ring 140' mesh with each other, the outer-diameter portion 141 of the support ring 140' may be inserted into the inner-diameter portion 131 of the clutch ring 130'.

The inclined contact surface 131*b*' may be provided at one side of the tip of the tooth 131*a*' of the clutch ring 130'.

The tip end 131*c*' of the tooth 131*a*' of the clutch ring 130', which excludes the inclined contact surface 131*b*', may be configured as a flat surface.

The tip end 131*c*' of the tooth 131*a*' of the clutch ring 130', which is configured as a flat surface, and a side surface of the adjacent tooth 131*a*' of the clutch ring 130' may define a right angle.

The inclined contact surface 131*b*' may be configured as an inclined surface that defines an obtuse angle OA with respect to the tip end 131*c*' of the tooth 131*a*' of the clutch ring 130'.

The counterpart inclined contact surface 141*b*' may be provided at one side of the tip of the tooth 141*a*' of the support ring 140' opposite to the inclined contact surface 131*b*'.

The tip end 141*c*' of the tooth 141*a*' of the support ring 140', which excludes the counterpart inclined contact surface 141*b*', may be configured as a flat surface.

The counterpart inclined contact surface 141*b*' may be configured as an inclined surface that defines the obtuse angle OA with respect to the tip end 141*c*' of the tooth 141*a*' of the support ring 140'.

When the clutch ring 130' and the support ring 140' mesh with each other, the clutch ring 130' moves toward the support ring 140', and the inclined contact surface 131*b*' of the tooth 131*a*' of the clutch ring 130' may come into contact with the counterpart inclined contact surface 141*b*' of the support ring 140'.

The teeth 131*a*' of the clutch ring 130' may be easily inserted between the teeth 141*a*' of the support ring 140' as the inclined contact surface 131*b*' slides along the counterpart inclined contact surface 141*b*' in a state in which the inclined contact surface 131*b*' is in contact with the counterpart inclined contact surface 141*b*' of the support ring 140'. Therefore, the clutch ring 130' and the support ring 140' may smoothly mesh with each other.

Meanwhile, an extension portion 132, which is connected to the sleeve 120, may be provided on the surface of the clutch ring 130' directed toward the sleeve 120. The extension portion 132 may be provided as a plurality of extension portions 132. The extension portion 132 may be connected to the connection portion 121 of the sleeve 120.

Figure 6:
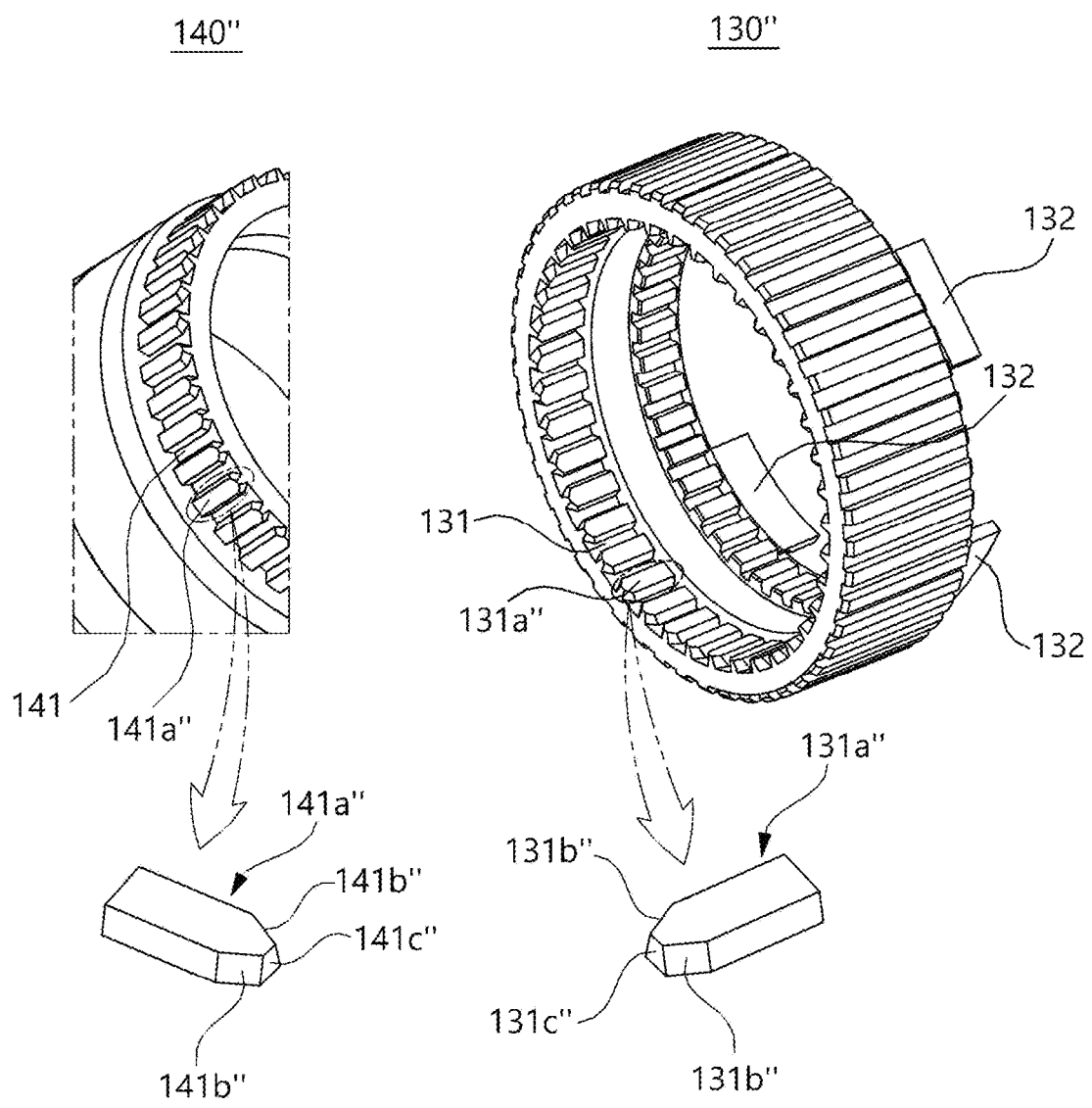
FIG. 6 is an enlarged view of a clutch ring and a support ring according to a third embodiment of the present invention.
Figure 7:
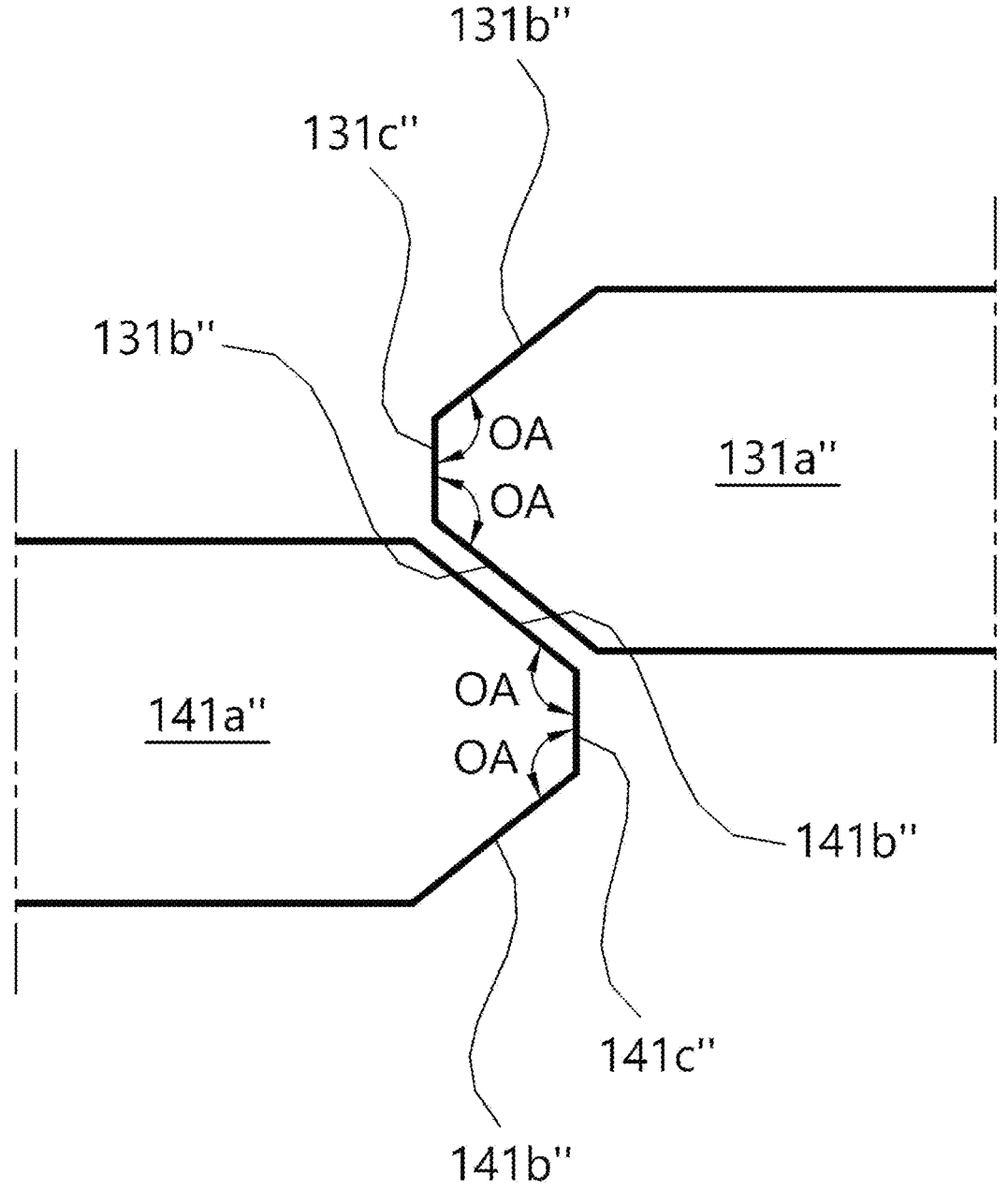
FIG. 7 is a view schematically illustrating a tooth of the clutch ring and a tooth of the support ring in FIG. 6.

FIG. 6 is an enlarged view of a clutch ring and a support ring according to a third embodiment of the present invention, and FIG. 7 is a view schematically illustrating a tooth of the clutch ring and a tooth of the support ring in FIG. 6.

As illustrated in FIGS. 6 and 7, in the third embodiment of the present invention, the teeth 131*a*" of the clutch ring 130" may be formed along the inner-diameter portion 131 directed toward the support ring 140". The teeth 141*a*" of the support ring 140" may be formed along the outer-diameter portion 141 directed toward the clutch ring 130". When the clutch ring 130" and the support ring 140" mesh with each other, the outer-diameter portion 141 of the support ring 140" may be inserted into the inner-diameter portion 131 of the clutch ring 130".

The inclined contact surfaces 131*b*" may be provided at two opposite sides of the tip of the tooth 131*a*" of the clutch ring 130".

The counterpart inclined contact surfaces 141*b*" may be provided at two opposite sides of the tip of the tooth 141*a*" of the support ring 140" opposite to the inclined contact surfaces 131*b*" provided at the two opposite sides.

The tip end 131*c*" of the tooth 131*a*" of the clutch ring 130", which is positioned between the inclined contact surfaces 131*b*" provided at two opposite sides, may be configured as a flat surface.

The inclined contact surface 131*b*" may be configured as an inclined surface that defines the obtuse angle OA with respect to the tip end 141*c*" of the tooth 131*a*" of the clutch ring 130" that is configured as a flat surface.

The tip end 141*c*" of the tooth 141*a*" of the support ring 140", which is provided between the counterpart inclined contact surfaces 141*b*" provided at two opposite sides, may be configured as a flat surface.

The counterpart inclined contact surface 141*b*" may define the obtuse angle OA with respect to the tip end 141*c*" of the tooth 141*a*" of the support ring 140".

When the clutch ring 130" and the support ring 140" mesh with each other, the clutch ring 130" moves toward the support ring 140", and one of the two inclined contact surfaces 131*b*" of the tooth 131*a*" of the clutch ring 130" may come into contact with the counterpart inclined contact surface 141*b*" of the opposing support ring 140".

The teeth 131*a*" of the clutch ring 130" may be easily inserted between the teeth 141*a*" of the support ring 140" as the inclined contact surface 131*b*" slides along the counterpart inclined contact surface 141*b*" in a state in which the inclined contact surface 131*b*" is in contact with the counterpart inclined contact surface 141*b*" of the support ring 140". Therefore, the clutch ring 130" and the support ring 140" may smoothly mesh with each other.

Meanwhile, the extension portion 132, which is connected to the sleeve 120, may be provided on the surface of the clutch ring 130" directed toward the sleeve 120. The extension portion 132 may be provided as a plurality of extension portions 132. The extension portion 132 may be connected to the connection portion 121 of the sleeve 120.

As described above, according to the present invention, at least one inclined contact surface and at least one counterpart inclined contact surface are formed at the tips of the teeth of the clutch ring and the support ring, such that the clutch ring and the support ring may smoothly mesh with each other. In addition, according to the present invention, it is possible to solve the problem in the related art in that because the tips of the teeth of the clutch ring and the support ring each have a flat surface structure, an impact occurs as the teeth of the clutch ring and the teeth of the support ring collide with each other when the clutch ring and the support ring mesh with each other, and a large amount of time is required for the clutch ring and the support ring to mesh with each other.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A structure of a clutch ring and a support ring, the structure comprising:
   at least one inclined contact surface defined at a tip portion of a tooth of the clutch ring;
   at least one counterpart inclined contact surface defined at a tip portion of a tooth of the support ring;
   a sleeve connected to the clutch ring,
   wherein the at least one inclined contact surface is configured to slide in a state in which the at least one inclined contact surface is in contact with the at least one counterpart inclined contact surface, such that the clutch ring and the support ring mesh with each other,
   wherein the at least one inclined contact surface is defined at one side of the tip portion of the tooth of the clutch ring, and wherein the at least one inclined contact surface defines an acute angle with respect to a side surface of the tooth of the clutch ring, a distal end of the at least one inclined contact surface and a distal end of the side surface of the tooth of the clutch ring meeting to define a distal end of the tip portion of the tooth of the clutch ring,
   wherein teeth of the clutch ring including the tooth of the clutch ring are disposed along an inner-diameter portion of the clutch ring directed toward the support ring, and
   wherein teeth of the support ring including the tooth of the support ring are disposed along an outer-diameter portion of the support ring directed toward the clutch ring,
   wherein the clutch ring includes an extension portion disposed on a surface of the clutch ring, the surface of the clutch ring facing the sleeve, the extension portion extending in a direction parallel to an axial direction of the clutch ring toward the sleeve,
   wherein the sleeve includes a connection portion disposed on a surface of the sleeve, the surface of the sleeve facing the clutch ring, the connection portion extending in a direction parallel to an axial direction of the sleeve toward the clutch ring,
   wherein the extension portion is connected to the connection portion.

2. The structure of claim 1,
   wherein the at least one counterpart inclined contact surface is defined at one side of the tip portion of the tooth of the support ring opposite to the at least one inclined contact surface, and
   wherein the at least one counterpart inclined contact surface defines an acute angle with respect to a side surface of the tooth of the support ring, a distal end the at least one counterpart inclined contact surface and a distal end of the side surface of the tooth of the support ring meeting to define a distal end of the tip portion of the tooth of the support ring.

3. A structure of a clutch ring and a support ring, the structure comprising:
   two inclined contact surfaces defined at a tip portion of a tooth of the clutch ring; and
   two counterpart inclined contact surfaces defined at a tip portion of a tooth of the support ring,
   wherein the two inclined contact surfaces are configured to slide in a state in which one of the two inclined contact surfaces is in contact with one of the two counterpart inclined contact surfaces, such that the clutch ring and the support ring mesh with each other,
   wherein the two inclined contact surfaces are defined at two opposite sides of the tip portion of the tooth of the clutch ring, respectively,
   wherein a distal end of the tip portion of the tooth of the clutch ring, which is positioned between the two inclined contact surfaces defined at the two opposite sides of the tip portion of the tooth of the clutch ring, is a flat surface, and
   wherein each of the two inclined contact surfaces defines an obtuse angle with respect to the distal end of the tip portion of the tooth of the clutch ring,
   wherein the clutch ring includes an extension portion disposed on a surface of the clutch ring, the surface of the clutch ring facing a sleeve, the extension portion extending in a direction parallel to an axial direction of the clutch ring toward the sleeve,
   wherein the sleeve includes a connection portion disposed on a surface of the sleeve, the surface of the sleeve facing the clutch ring, the connection portion extending in a direction parallel to an axial direction of the sleeve toward the clutch ring, wherein the extension portion is connected to the connection portion.

4. The structure of claim 3, wherein the two counterpart inclined contact surfaces are defined at two opposite sides of the tip portion of the tooth of the support ring opposite to the two inclined contact surfaces defined at the two opposite sides of the tip portion of the tooth of the clutch ring.

5. The structure of claim 4, wherein a distal end of the tip portion of the tooth of the support ring, which is positioned between the two counterpart inclined contact surfaces defined at the two opposite sides of the tip portion of the tooth of the support ring, has a flat surface, and wherein each of the two counterpart inclined contact surfaces defines an obtuse angle with respect to the distal end of the tip portion of the tooth of the support ring.

6. The structure of claim 1, wherein the clutch ring and the support ring are mounted in a casing of a disconnector apparatus configured to switch between a two-wheel drive (2WD) mode and a four-wheel drive (4WD) mode, and wherein the clutch ring is configured to mesh with the support ring while being moved toward the support ring by the sleeve connected to the clutch ring.

\*  \*  \*  \*  \*